Figure 8:
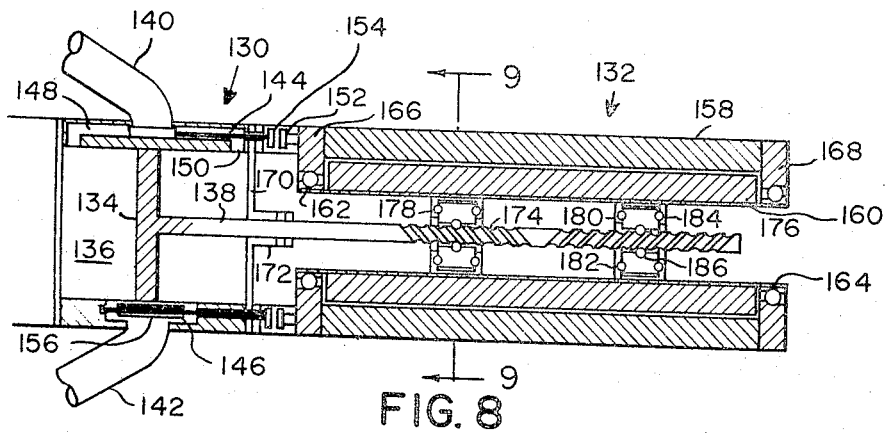

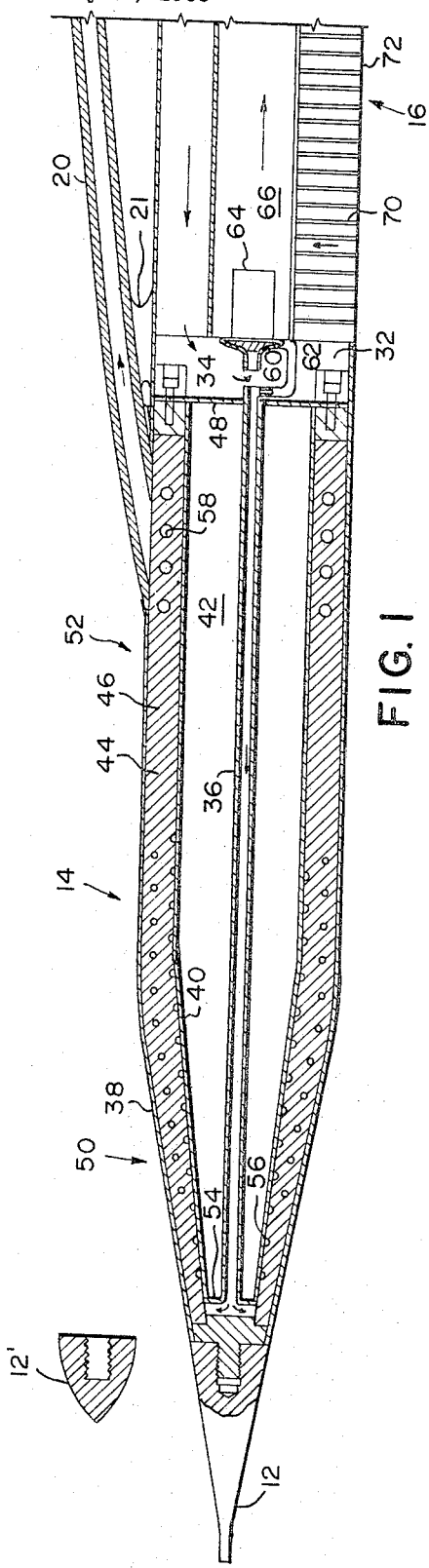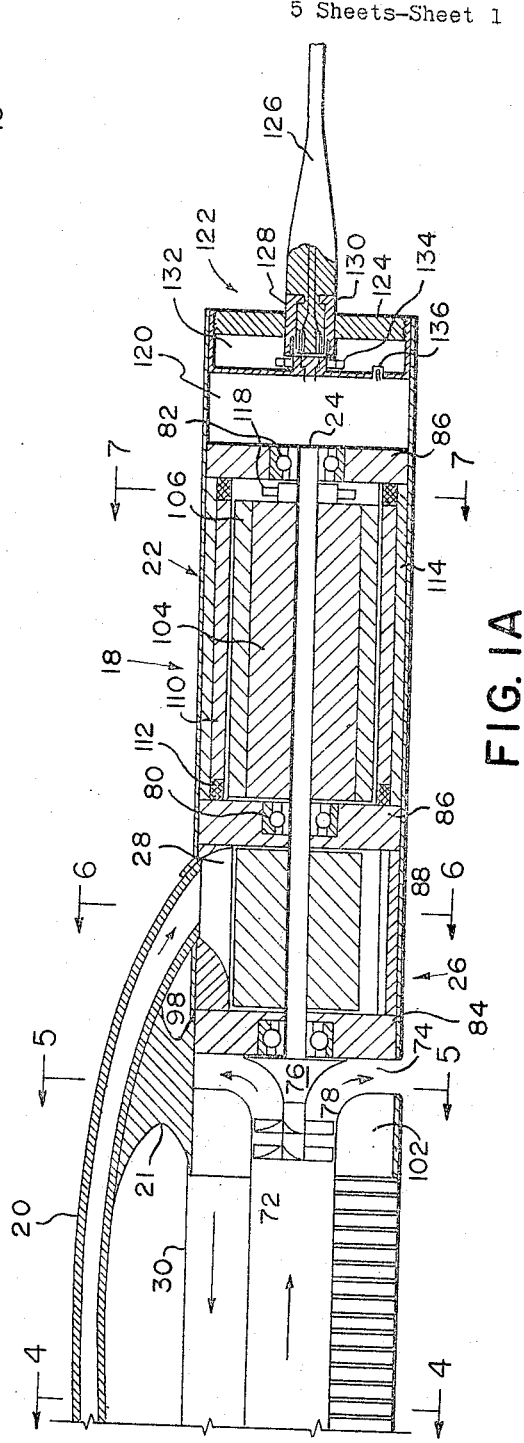

Oct. 24, 1967 O. J. BIRKESTRAND 3,349,247
PORTABLE ELECTRIC GENERATOR
Filed May 10, 1966 5 Sheets-Sheet 2
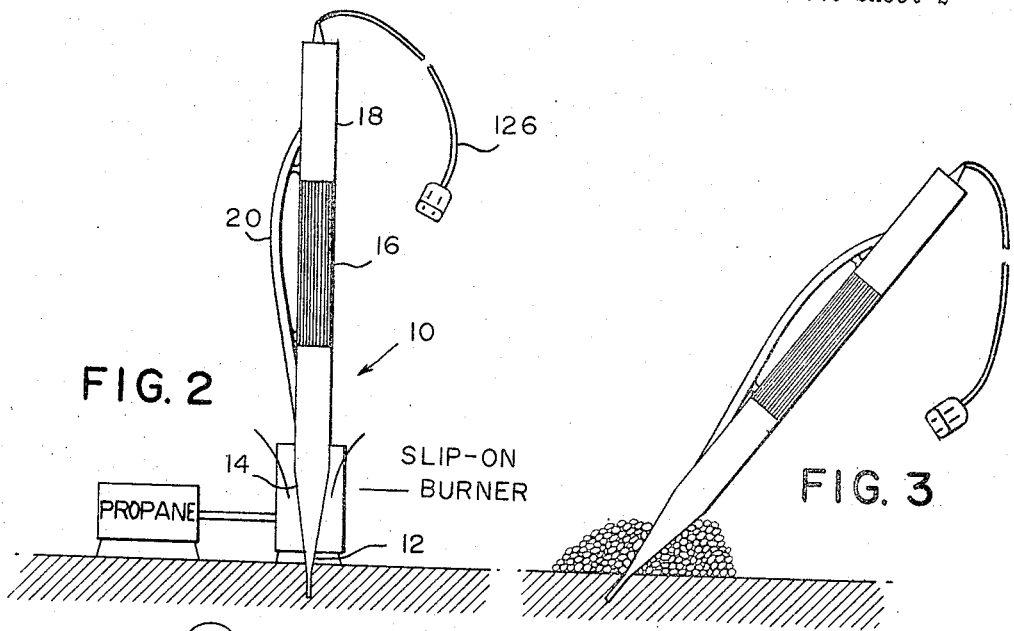
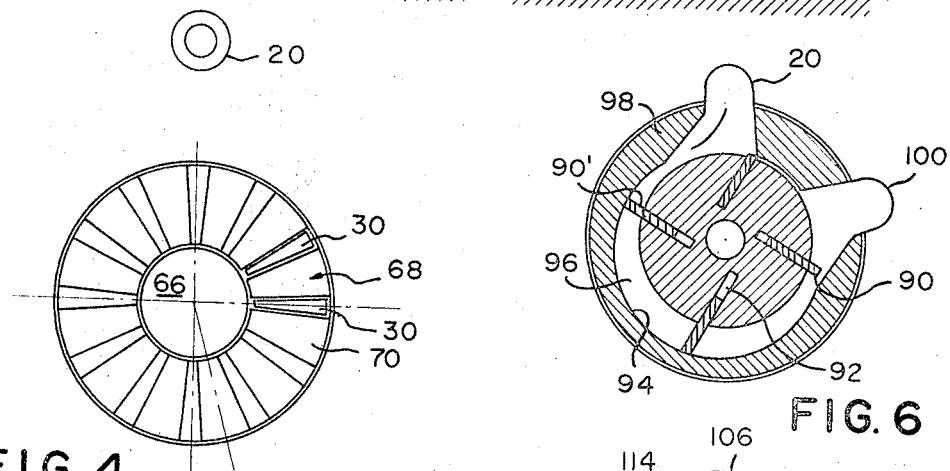
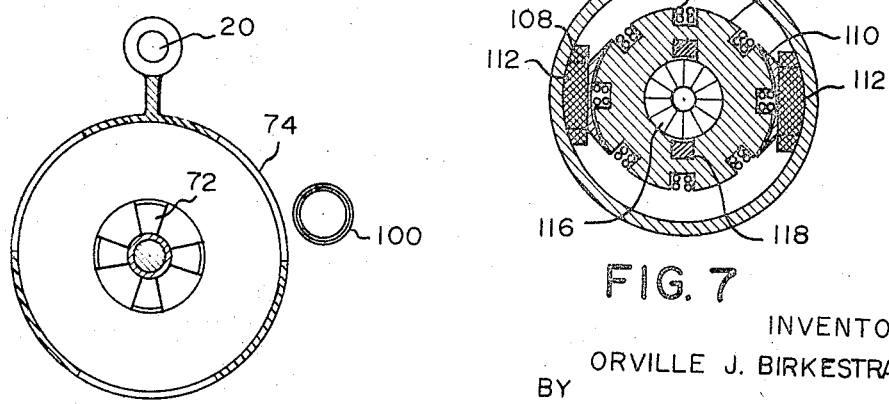
INVENTOR
ORVILLE J. BIRKESTRAND
BY
Morse, Altman + Oates
ATTORNEYS Oct. 24, 1967  O. J. BIRKESTRAND  3,349,247
PORTABLE ELECTRIC GENERATOR
Filed May 10, 1966  5 Sheets-Sheet 3

INVENTOR
ORVILLE J BIRKESTRAND
BY
Morse, Altman & Oates
ATTORNEYS

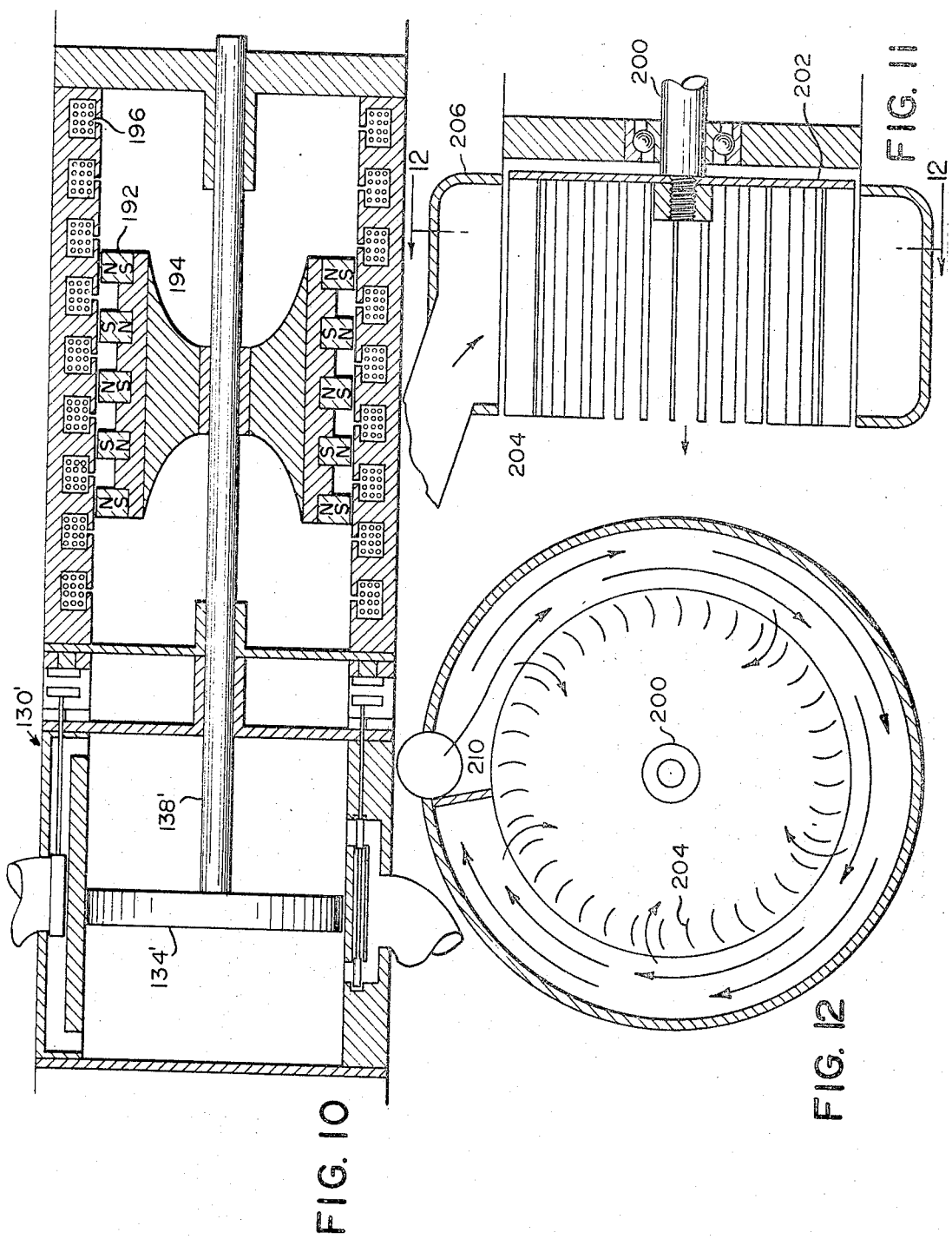

Oct. 24, 1967  O. J. BIRKESTRAND  3,349,247
PORTABLE ELECTRIC GENERATOR
Filed May 10, 1966
5 Sheets-Sheet 5

INVENTOR
ORVILLE J. BIRKESTRAND
BY Morse, Altman + Oates
ATTORNEYS

United States Patent Office 3,349,247
Patented Oct. 24, 1967

3,349,247
PORTABLE ELECTRIC GENERATOR
Orville J. Birkestrand, 7 High St.,
Westboro, Mass. 01581
Filed May 10, 1966, Ser. No. 548,887
11 Claims. (Cl. 290—1)

This invention relates generally to electric generators and more particularly is directed towards a new and improved portable steam driven generator adapted to be operated by any one of a variety of conveniently available heat sources.

There are available a great many different types of portable electric generators. Most of such portable generators are driven by internal combustion engines utilizing gasoline or gasoline and oil mixture as fuel. Characteristically such generators are heavy and bulky in addition to being quite noisy to operate. Furthermore, this type of generator frequently is difficult to start and provides rather irregular performance. In addition, generators driven by internal combustion engines require a supply of a specific type of fuel in order to operate. While steam driven generators are also available these, as a rule, are bulky installations designed for specific applications. It is therefore an object of the present invention to provide improvements in portable electric generators.

Another object of this invention is to provide a small portable electric generator which is efficient to operate, easy to start and requires no special energy source.

A further object of this invention is to provide a small compact and lightweight steam driven electrical generator capable of operating from any one of a variety of commonly available heat sources.

A still further object of this invention is to provide a self-contained, integrated portable electrical generator requiring only a heat source to produce electricity.

More particularly, this invention features a portable electrical generator comprising an elongated portable structure including a boiler portion at one end, a condenser portion intermediate of the ends and a steam driven motor-generator at the opposite end with a tube connecting the boiler portion to the steam driven motor whereby steam, generated in the boiler portion upon application of heat to the boiler end of the structure, will be carried to the opposite end of the structure to drive the generator with the exhausted steam condensed in the condenser portion and returned to the boiler portion for recycling.

Further features of this invention include a novel system for condensing steam, novel motor-generators and a novel voltage regulator for maintaining a substantially constant output of electricity regardless of variations in the heat source.

Figure 9:
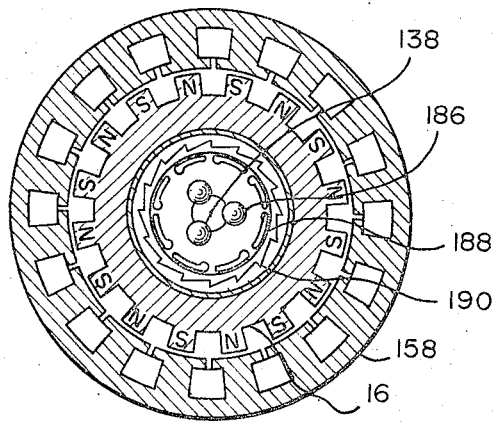
Figure 16:
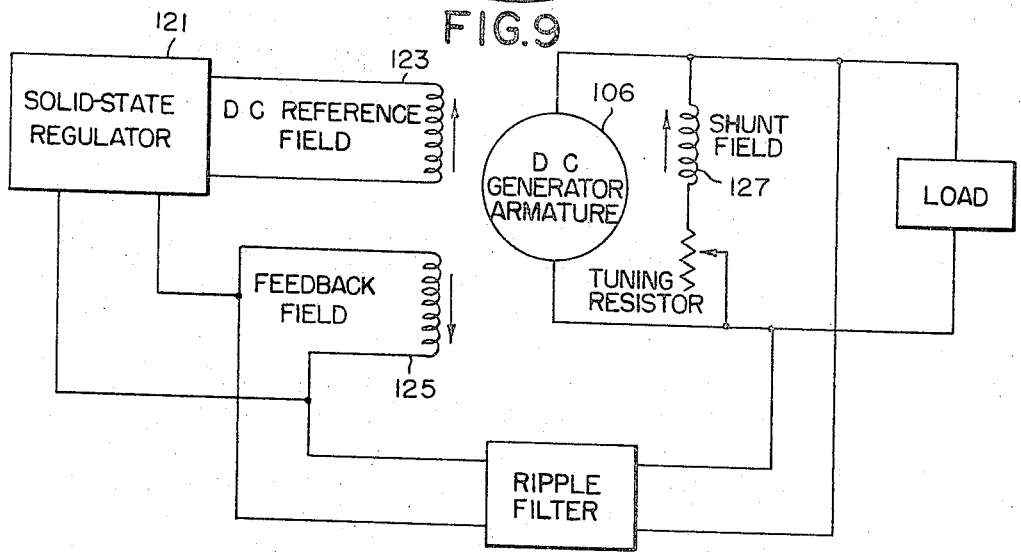
Figure 13:
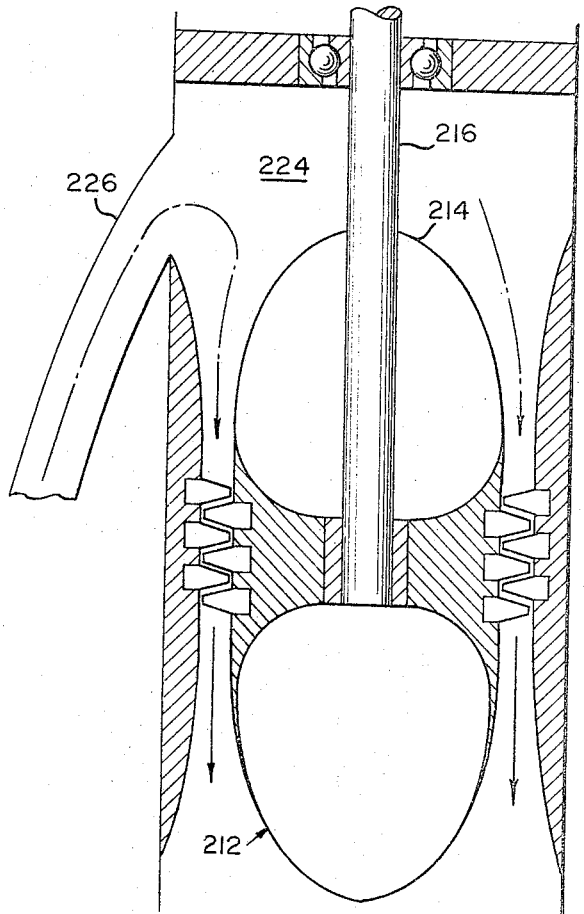
Figure 14:
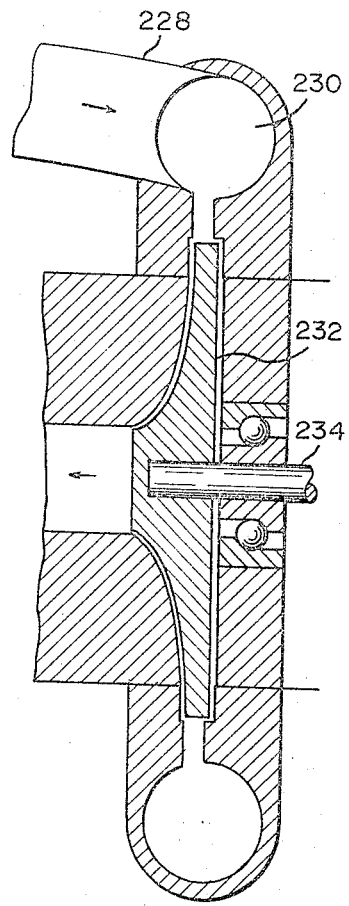
Figure 15:
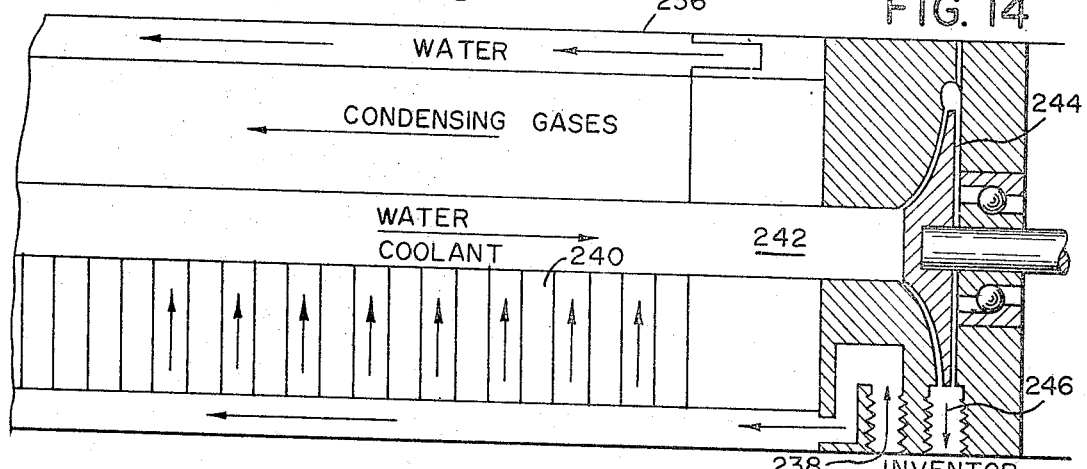

However, these and other features of the invention, along with further objects and advantages thereof will become more fully apparent from the following detailed description of preferred embodiments of the invention, with reference being made to the accompanying drawings, in which:

FIGS. 1 and 1A are sectional side elevations of a portable electrical generator made according to the invention with FIG. 1 showing the boiler portion and part of the condenser portion while FIG. 1A shows the remaining portion of the condenser portion and the motor-generator portion, FIG. 2 is a view in side elevation of a portable generator made according to the invention and using a gas burner as a heat source, FIG. 3 is a side elevation of a portable generator of the sort shown in FIG. 1 but in this instance utilizing a campfire as a heat source, FIG. 4 is a cross-sectional view taken along the lines 4—4 of FIG. 1A, FIG. 5 is a cross-sectional view taken along the lines 5—5 of FIG. 1A, FIG. 6 is a cross-sectional view taken along the lines 6—6 of FIG. 1A, FIG. 7 is a cross-sectional view taken along the lines 7—7 of FIG. 1A, FIG. 8 is a sectional side elevation showing a modified generator and prime mover, FIG. 9 is a cross-sectional view taken along the line 9—9 of FIG. 8, FIG. 10 is a view similar to FIG. 8 but showing a modified motor-generator, FIG. 11 is a sectional view in side elevation showing another prime mover for use with the invention, FIG. 12 is a cross-sectional view taken along the line 12—12 of FIG. 11, FIGS. 12, 13 and 14 are sectional views in side elevation showing two further modifications of the prime mover, FIG. 15 is a fragmentary sectional view in side elevation showing a modification of the condenser portion of the invention, and FIG. 16 is a circuit diagram showing a voltage regulator made according to the invention for use with the portable generator.

Referring now to the drawings, the reference character 10 generally indicates a portable electrical generator of elongated construction which, in the preferred mode, is fabricated with a generally cylindrical housing, the lower end of which is formed into a spike tip 12 whereby the housing may be stuck into the ground in an upright or tilted position as suggested in FIG. 3. The spike tip 12 is mounted by a screw connection whereby it may be readily replaced by a blunt tip 12' if desired.

The generator is an integrated steam driven apparatus and is generally organized into three functional sections; these being a boiler portion 14 at the left-hand end as viewed in FIG. 1, a condenser portion 16 located in the mid-portion of the housing, and a motor generator portion 18 located at the right-hand end of the structure as viewed in FIG. 1A. A steam tube 20 mounted to handle supports 21 connects the boiler portion 14 to the motor generator portion 18 and also serves as a convenient handle for carrying the unit about. In the embodiment of FIGS. 1 and 1A, the motor generator includes an electrical generator 22 drivingly connected by a shaft 24 to a prime mover 26 which in FIG. 1A is a turbine driven by steam delivered through the tube 20. Steam exhausted from the turbine 28 passes down through condenser tubes 30 into a condensate well 32 where a condensate pump 34 feeds condensate under pressure through a feed line 36 down to the end of the boiler portion 14 where it is again converted into steam and passed back through the tube 20 in a continuous closed loop steam cycle.

Referring now more particularly to the boiler portion 14 it will be seen that it is fabricated with a cylindrical outer casing 38 and a cylindrical inner casing 40 defining an annular central void 42, through which the feed tube 36 extends, and an annular boiler region 44 between the outer boiler casing 38 and the inner boiler casing 40.

The annular boiler region 44 in the illustrated embodiment is filled with a porous sintered metal fibre aggregate such as that sold under the trademark "Feltmetal" by the Huyck Metals Company. This sintered metal fill is generally indicated by the reference character 46 and serves to facilitate rapid heat transfer to the boiling working fluid and its gas. It also serves to keep the unboiled liquid from being carried up to the prime mover by the gases. The sintered metal fill extends from the start of the boiler section back to the condensate well 32 from which it is insulated by a thermal insulating wall 48. The boiler portion 14 may be considered to be divided into a boiler zone 50, at the left-hand end thereof and a super heater zone 52 located at the right-hand or discharge end of the boiler in communication with the tube 20.

As shown in FIG. 1 the feed water is delivered under pressure to the tube 36 down to a discharge manifold 54. The feed is introduced to the lower end of the boiler entering the porous metal fill between the inner and outer boiler casings 38 and 40. It will be understood that this end of the boiler will be located in a suitable heat source such as a camp fire, for example, as suggested in FIG. 3 or in a gas burner as suggested in FIG. 2. In any event, when sufficient heat is applied to this end of the unit the feed water or other liquid medium will boil. As it carries back through the boiler it will convert into steam and pass through the super heater zone 52 where the temperature of the steam will be raised for greater operating efficiency.

In order to facilitate distribution of the working fluid feed within the boiler, half round annular voids 56 are formed in the sintered metal fill next to the inner boiler casing 40 and typically arrayed in a spiral path from the manifold 54 back to the end of the boiler zone 50. Annular voids 58 of circular cross-section are also formed in the porous metal fill to facilitate a rapid and orderly exit of the steam once it is formed.

The porous sintered metal fill 46 can be provided with precise control over its density, permeability and thermal-conductivity. The material is available in many metals and alloys in a wide range of fibre sizes. Density can range from 5% of solid continuously up to 80% and pore size from 2 microns upward.

There is no need to thermally insulate the super heater zone from the boiler zone as the connecting porous metal between the casings cannot transmit heat fast enough down to the boiling liquid's temperature but it can transmit heat fast enough down to the boiling liquid to keep the super heater from over-heating. This not only permits the heating of the gases but also effectively extends the boiling zone. These sections are built as one unit, the temperature of the super heater rising gradually from that of the boiling liquid at its lower end to the higher super heat temperature at its upper end.

The condensate collection well 32, being located between the condenser and the boiler, effectively insulates the top of the super heater section from the bottom of the condenser. The condensate entering into the well 32 is drawn into the condensate pump 34 through inlet 60 and pumped out through loop 62 to the feed tube 36. The pump 34 is driven by motor 64 located in a central cooling passage 66 whereby the motor may run in a cool, dry condition.

The condenser section 16 includes an array of condenser tubes 30, generally wedge-shaped in cross-section, disposed in radial array as shown in FIG. 4. These tubes are angularly spaced from one another to provide radial passages 68 between each pair of tubes. These passages connect with the center axial cooling passage 66, which extends the full length of the condenser section, with the atmosphere. Wedge-shaped cooling fins 70 are longitudinally spaced along the radial passages 68 and provide multiple heat transfer surfaces for the condenser. The condenser itself is housed within a condenser casing 72 of generally cylindrical cross-section and conforming in dimensions to the boiler section. The condenser casing is suitably apertured to permit the free flowing of cooling air to be drawn radially inward to the cooling passage 66.

In order to enhance the cooling action within the condenser, a fan 72 on the lower end of the shaft 24 is located in the upper end of the cooling passage 66 and serves to draw cooling air into the chamber and upwardly alongside the tubes 30 in a counterflow arrangement for optimum heat transfer. From the fan 72, the cooling air is discharged through ports 74 located about the upper end of the condenser section. A hub 76 is provided on the shaft 24 and serves to guide the air out through the ports.

While this fan is shown directly driven by the prime mover, it may also be separately driven by means of a small electric motor the speed of which may be controlled by the temperature of the condensate or the temperature of the condenser, as desired.

The shaft 24 is supported for rotation by means of spaced ball bearings 78, 80 and 82 seated in spaced annular plates 84, 86 and 88. In the principal embodiment, the prime mover for the generator is a turbine co-axially mounted to the shaft 24 between plates 84 and 86. This turbine includes a rotor 88 of cylindrical construction and carrying an array of slideable vanes 90 (FIG. 6), these vanes are seated in longitudinal slots 92 which extend chordally into the rotor from the periphery thereof. The centrifugal force of the rotating rotor urges the vanes outwardly so that the outer edges bear against an inner wall 94 of an expansion chamber 96 formed within a turbine housing 98. The expansion chamber 96 is somewhat eccentric in order to provide a gradually increasing volume for the entering steam.

As best shown in FIG. 6 the steam enters the turbine from the tube 20, passing through the housing to work against the partially extended vane 90' thereby urging the rotor counterclockwise as viewed in FIG. 6. As the rotor turns, the vane slides outwardly bearing against the wall of the chamber and providing an increased working surface for the steam. As it continues around the chamber the vane is moved gradually back into the slot and the steam exhausts out through a tube 100 which forms a short external loop back to the top of the condenser where it communicates with the condenser tubes 30 by means of a manifold 102.

The generator shown in FIG. 1A is a regulated D.C. shunt generator and includes a laminated armature 104 of generally cylindrical construction and keyed to the shaft 24. The armature carries an array of armature coils 106 and is mounted for rotation between the arcuate faces of field pole pieces 108 and 110 located on either side of the housing. Each pole piece is provided with field coils 112 and all disposed within an iron yoke 114.

At the right-hand of the generator as viewed in FIG. 1A is a commutator 116 and brushes 118. The leads from the commutator and from the field coils are carried back through the plate 86 into a chamber 120 in which is housed electrical components and circuitry to be described more fully below. At the extreme right-hand end of the unit is an end cap assembly 122 which includes a cap 124, a cord 126, a connector 128 and a connecting post 130. In storage the electrical outlet cord 126 is wound around the connecting post 130 and the end cap 124 is screwed onto the end of the housing to seal chamber 132. The end cap unit, in practice, includes a small cover (not shown) for a center opening and the smaller cover may be unscrewed and stored in the connector chamber when the generator is to be operated. The electrical cord is then screwed onto the connecting post through the central opening formed in the larger cap. Then this cord is screwed onto the connecting post, the larger cap is screwed on the end of the unit which again seals the chamber.

In practice, a voltage selector switch 134 may be provided within the chamber 132 as is a pilot light 136. The switch controls the voltage appearing at the connector output and typical selections may be on the order of 6 volts D.C., 12 volts D.C., 28 volts D.C. or 110 volts A.C. The pilot lights serve to indicate whether or not the unit is operating within its designed range.

Referring more particularly to FIG. 16 there is shown a circuit diagram for a regulated D.C. shunt generator including a solid state regulator 121 adapted to supply a constant D.C. voltage to a reference field 123 from the varying voltage of a feedback field 125 from the armature's 106 voltage output. This field is differentially compared with the D.C. reference field 123 and this net field then either aids or opposes an exciting shunt field 127 adjusting the output voltage until the desired value is reached.

This arrangement eliminates the need for a separate D.C. reference source. A D.C. to D.C. or D.C. to A.C. power converter may be inserted between the generator circuit and the load to obtain the desired output.

Referring now more particularly to FIGS. 8 and 9 there is shown a modification of the motor-generator system. In FIG. 8 the modification includes a reciprocating prime mover 130 and a reciprocating electrical generator 132 drivingly connected thereto. The reciprocating prime mover includes a single piston 134 within a cylinder 136 and mounted to the end of a connecting rod 138 which extends into the generator portion. Steam is introduced to the chamber 136 through steam tube 140 and is exhausted through tube 142 to the condenser. The valving of the cylinder is controlled by means of electrically actuated valves 144 for the inlet and 146 for the exhaust. It will be understood that the valve 144, according to its position, directs steam from the tube 140 to one side or the other of the piston through manifold lines 148 and 150. It will also be understood that the valve is adapted to slide longitudinally and is controlled by means of sequentially actuated timing coils 152 which coact with magnetically attractive members 154. Similarly the exhaust valve 146 directs exhaust steam out through manifold 156 according to the position of the valve.

The generator section includes a laminated armature 158 carrying the usual coils disposed about a permanent magnetic field member 160 rotatably supported by bearings 162 and 164. These bearings are mounted in annular walls 166 and 168.

The connecting rod 138 passes through cylinder wall 170 formed with a collar 172. The collar opening and the connecting rod 138 are non-circular in cross-section, typically triangular, to prevent rotation of the piston and rod during reciprocation thereof for reasons that will presently appear. It will be noted that the right-hand end of the connecting rod 138 is formed into a double worm configuration—one portion being formed with left-hand grooves and the other portion being formed with right-hand grooves.

The two threaded portions drivingly engage a pair of spaced linear to rotary converters 178 and 180. These converters each comprises an inner race 182 and outer race 184. The inner race carries three rotatable bearing balls 180 evenly spaced and seated in the helical worm grooves of the connecting rod. It will be seen that the three bearing balls are trapped in spherical recess of the inner race whereby reciprocation of the connecting rod will cause rotation of the inner race in one direction or the other according to which direction the rod is reciprocated. The inner race also carries a series of peripheral pawls 188 which are adapted to engage rachet teeth 190 formed about the inner face of the outer race 184. It will thus be understood that reciprocation of the connecting rod in one direction will cause the pawls to engage the outer race and thereby rotate the field assembly 160 whereas on an opposite stroke of the connecting rod, when the inner race is rotating in an opposite direction, no driving connection will take place. Insofar as the two converters are arranged to rotate in opposite directions for each stroke of the connecting rod, at least one of the converters will be providing driving action to the field element.

Referring now more particularly to FIG. 10, there is shown a modified form of generator adapted to be actuated by a reciprocating prime mover 130' similar to the reciprocating prime mover 130 illustrated in FIG. 8. In this instance double acting piston 134' carries a connecting rod 138' which in turn carries an array of permanent magnets 192 on a hub 194. Alternatively, the hub 194 could carry field coils. In any event, the hub carries the magnets for reciprocating movement past stationary armature coils 196 and the electromotive force is generated in these coils. This generator may have its average output voltage regulated through the use of feed-back and reference fields or may depend upon a solid state power regulator if the permanent magnet field is used.

Referring now more particularly to FIGS. 11 12, 13 and 14 there are shown three modifications of turbine prime movers for use in driving the rotary type of generator of the sort shown in the principal embodiment. In FIGS. 11 and 12 there is shown an impeller turbine 198 mounted for rotation on a shaft 200 and comprising a rotor 202 carrying an array of longitudinal vanes 204 spaced about the periphery of the rotor. These vanes align with an annular manifold 206 extending about the turbine and communicating with steam inlet 206 corresponding with the steam tube 20 of the principal embodiment. The manifold extends about the turbine housing and is divided by a wall 210. It will be understood that the steam entering the manifold and against the turbine vanes causes the rotor to rotate. The steam exhausts into the center of the rotor which is open and is delivered back to the condenser.

In the FIG. 13 embodiment there is shown an axial flow turbine 212 comprising a rotor 214 mounted on the shaft 216 and carrying an array of radial turbine blades 18 which cooperate with fixed turbine blades 220 mounted about the inner wall of turbine housing 222. Steam enters chamber 224 from steam tube 226 and flows along axial passage 228 to drive the turbine rotor and then exhaust into the condenser.

In the FIG. 14 embodiment, steam enters through steam line 228 into annular manifold 230 and is directed radially inward against a gas turbine 232 mounted on shaft 234. The steam is directed radially inward of the turbine and exhausts along the axial centerline back to the condenser.

Referring now more particularly to FIG. 15 there is shown a modification of the condenser and in this embodiment the condenser is cooled by water, or the like, in place of the air utilized in the principal embodiment. As shown in FIG. 15, the condenser is encased in a water jacket 236 disposed about the condenser portion of the apparatus and connected by a hose, for example, to a supply of water at inlet connection 238. As shown, the water enters at 238 and flows through the water jacket about the condenser in the same direction of flow as the condensing gases. The condenser structure is similar to that in the principal embodiment in that radial passages 240 extend from the water jacket axial passage 242 so that the cooling water flows in and around the condenser tubes for maximum heat transfer. In the center cooling passage 242 the cooling water is drawn in an axially opposite direction by means of a pump 244 which is driven by the prime mover and discharges the coolant through outlet 246. The discharge water may then be utilized for indoor heating purposes whereby the apparatus serves the double function of providing indoor heating and electrical power.

The apparatus thus far described operates as a closed loop but with certain modifications could be operated as an open cycle device using an expendable fluid working media such as water, for example. In such an embodiment the condenser region could serve as a water tank supplying the boiler and superheater, which along with the remaining portion of the apparatus, would be substantially identical to that disclosed in the principal embodiment.

Obviously the condenser may be fabricated in a variety of configurations keeping in mind the primary consideration of providing an efficient contact between the cooling medium and the condensing working medium through the cooling surfaces.

Various working fluids may be employed in the apparatus although water is preferred since it is chemically stable, safe, readily available and inexpensive. Numerous other liquids may be utilized as desired.

Among other possible modifications would be to eliminate the electric motor which operates the condensate feed pump and in its place utilize a drive shaft coupled to the prime mover for a direct drive system. When the feed pump is in the electric motor mode of the principal embodiment it is directly coupled to the centrifugal pump and powered by the generator. The pump raises the low pressure of the condensate to the higher pressures of the boiling region and the pump may be designed to provide a constant speed and pressure output, or its speed and pressure may be regulated by the temperature of the boiling working fluid (the temperature determines the pressure). It will be understood that in an open cycle operation as suggested above, the feed pump may be eliminated assuming that a pressurized water supply line is available.

It will be understood that the apparatus may be provided with suitable safety pressure valves where needed. For example, the condenser may be provided with a single acting pressure relief valve that will vent the inner region of the condenser, to the boiler or to the superheater section in case a critical pressure is exceeded. Actuation of the relief valve may trigger either a buzzer or indicating light to put the operator on notice. Such a relief valve should be manually reset and the working fluid replenished before operation is resumed. Also the superheater may have a similar valve venting it into the inner region of the superheater section.

The apparatus illustrated and described herewith is compact, light in weight and therefore easily transportable. It is also quiet in operation, clean and functional. The apparatus requires no special fuel to operate and may be energized by any available heat source sufficient to boil the working fluid. The apparatus gives off no loud operating noises or noxious odors as with internal combustion engines. It will be understood that the device may be poked into the middle of a campfire, supported on a bottled gas burner, installed in the uptake flue of a stove or applied to any other available source of heat whether indoors or outdoors. The devices may be fabricated in a wide range of sizes and power ratings ranging from less than 100 watts, for example, to an excess of 5 kilowatts.

The apparatus may be used to advantage by hunters, campers, hikers, and the like or by military personnel whenever there is a need to generate local electricity.

While the invention has been described with particular reference to the illustrated embodiments and it will be understood that numerous modifications thereto will appear to those skilled in the art. Accordingly the above description and accompanying drawings should be taken as illustrative of the invention and not in a limiting sense.

Having thus described the invention, what I claim and desire to obtain by Letters Patent of the United States is:

1. A portable electric generator, comprising
   (a) a boiler adapted, upon the application of heat, to convert a liquid medium into a pressurized gaseous medium,
   (b) a prime mover connected to said boiler and adapted to be driven by said gaseous medium,
   (c) an electric generator drivingly connected to said prime mover and adapted to generate an electrical current upon operation of said prime mover, and,
   (d) a condenser connected to said boiler and said prime mover for condensing the gaseous exhaust of said prime mover to a liquid medium for said boiler,
   (e) said boiler, prime mover, generator and condenser being assembled in end-to-end relation as an integrated elongated manually portable structure with said boiler at one end thereof,
   (f) said boiler including walls defining an annular chamber extending the length of said boiler, the outermost walls of said boiler serving as heat receiving surfaces and as part of the elongated structure,
   (g) said walls being formed with a central inlet at the outermost end of said boiler to receive condensate feed therein and an outlet at the opposite end thereof for the discharge of steam to said prime mover, and
   (h) conduit means extending from said inlet centrally through said boiler to said condenser.

2. A portable electric generator according to claim 1 including self-contained blower means driven by said generator for passing a longitudinal flow of cooling air over said condenser.

3. A portable electric generator according to claim 1 wherein said condenser includes a circular array of spaced parallel tubes communicating with said prime mover to receive the exhaust therefrom, said tubes defining a central longitudinal passage for the flow of a cooling medium.

4. A portable electric generator according to claim 1 including a porous metal material filling said boiler chamber.

5. A portable electric generator according to claim 1 including porous material disposed in said chamber and formed with annular passages spaced between said inlet and outlet.

6. A portable electric generator, comprising
   (a) an elongated generally cylindrical housing,
   (b) a boiler located at one end of said housing and adapted upon the application of heat to convert a liquid medium into a pressurized gaseous medium,
   (c) a prime mover located adjacent the opposite end of said housing and connected to said boiler,
   (d) an electric generator located at the opposite end of said housing and drivingly connected to said prime mover,
   (e) a condenser located medially of said housing between said boiler and said prime mover for condensing the gaseous exhaust of said prime mover to a liquid medium for said boiler,
   (f) the boiler end of said housing being formed with a tapered configuration defining a pointed end whereby said housing may be stuck upright into the ground.

7. A portable electric generator, comprising
   (a) a boiler adapted upon the application of heat to convert a liquid medium into a pressurized gaseous medium,
   (b) a prime mover connected to said boiler and adapted to be driven by said gaseous medium,
   (c) an electric generator drivingly connected to said prime mover and adapted to generate an electrical current on operation of said prime mover,
   (d) a condenser connected to said boiler and said prime mover for condensing the gaseous exhaust of said prime mover to a liquid medium for said boiler,
   (e) said boiler, prime mover, generator and condenser being assembled as an integrated elongated manually portable structure with said boiler at one end thereof, and
   (f) a spike mounted to said structure for standing said structure in a generally upright position with said boiler at the lower end thereof.

8. A portable electric generator, comprising
   (a) a boiler adapted upon the application of heat, to convert a liquid medium into a pressurized gaseous medium,
   (b) a prime mover, including a cylinder and a piston adapted to be reciprocated therein, connected to said boiler and adapted to be driven by said gaseous medium,
   (c) an electric generator drivingly connected to said prime mover and adapted to generate an electrical current on operation of said prime mover, and
   (d) a condenser connected to said boiler and said prime mover for condensing the gaseous exhaust of said prime mover to a liquid medium for said boiler,
   (e) said boiler, prime mover, generator and condenser being assembled as an integrated elongated manually portable structure with said boiler at one end thereof.

9. A portable electric generator according to claim 8 wherein said generator includes fixed field members and a rotary armature, a pair of cooperating linear to rotary converters connected to said armature and a double threaded rod connected to said piston and engaging said converters whereby a stroke of said piston in a linear direction will engage one of said converters to rotate said armature in one rotary direction and on a return stroke will engage the other of said converters to rotate said armature in the same rotary direction.

10. A portable electric generator according to claim 8 wherein said generator includes an array of axially spaced coils and an array of axially spaced magnets, one of said arrays being fixed and a rod connecting the other of said arrays to said piston whereby said other array will reciprocate past said one array upon reciprocation of said piston.

11. A portable electric generator, comprising
(a) a boiler adapted, upon the application of heat, to convert a liquid medium into a pressurized gaseous medium,
(b) a prime mover connected to said boiler and adapted to be driven by said gaseous medium,
(c) an electric generator drivingly connected to said prime mover and adapted to generate an electrical current upon operation of said prime mover,
(d) a condenser connected to said boiler and said prime mover for condensing the gaseous exhaust of said prime mover to a liquid medium for said boiler,
(e) said boiler, prime mover, generator and condenser being assembled as an integrated elongated manually portable structure with said boiler at one end thereof, and
(f) a combination handle and steam tube extending between said boiler and said prime mover exteriorly of said structure.

References Cited
UNITED STATES PATENTS

| | | | |
|---|---|---|---|
| 1,804,694 | 5/1931 | Jones | 60—108 |
| 2,707,863 | 5/1955 | Rhodes | 60—108 X |
| 2,916,635 | 12/1959 | Nicita | 290—2 X |
| 2,961,549 | 11/1960 | Shipalto | 290—1 |
| 2,961,550 | 11/1960 | Dittman | 290—2 |
| 3,242,345 | 3/1966 | Kimura et al. | 290—2 |

ORIS L. RADER, *Primary Examiner.*

G. SIMMONS, *Assistant Examiner.*